United States Patent [19]

Akimoto et al.

[11] Patent Number: 4,985,724
[45] Date of Patent: Jan. 15, 1991

[54] AUTOMATIC FOCUS/EXPOSURE OPERATION APPARATUS FOR CAMERA

[75] Inventors: Kazuo Akimoto; Toshiaki Hirai; Miyoshi Tanikawa, all of Chiba, Japan

[73] Assignee: Seikosha Co., Ltd., Tokyo, Japan

[21] Appl. No.: 394,596

[22] Filed: Aug. 16, 1989

[30] Foreign Application Priority Data

Aug. 17, 1988 [JP] Japan .................. 63-204227

[51] Int. Cl.$^5$ .......................... G03B 3/00; G03B 1/18; G03B 17/38
[52] U.S. Cl. ........................ 354/400; 354/195.11; 354/266; 354/412
[58] Field of Search ............... 354/400, 412, 486, 156, 354/195.11, 195.13, 266, 195.1, 289.1, 289.12, 251, 252, 230, 231, 261

[56] References Cited

U.S. PATENT DOCUMENTS 4,426,145 1/1984 Hashimoto ................ 354/195.1
4,803,506 2/1989 Diehl et al. ................ 354/400

Primary Examiner—Russell E. Adams
Assistant Examiner—Cassandra C. Spyrou
Attorney, Agent, or Firm—Jordan and Hamburg

[57] ABSTRACT

Apparatus for performing an automatic focus/exposure operation for a camera includes a drive member driven by a motor, a distance member for driving a lens focusing mechanism during a lens focusing operation in correspondence with movement of the drive member in a first direction, a retaining pawl for engaging the distance member means to prevent reverse movement of the distance member means upon completion of the lens focusing operation, and a blade opening/closing mechanism for opening blades during an exposure operation when the drive member moves in a second direction which is opposite to the first direction of the focusing operation, the blade opening/closing mechanism shifting the exposure operation quickly upon completion of the lens focusing operation.

14 Claims, 7 Drawing Sheets

ROTATIONAL ANGLE OF DRIVE RING

ROTATIONAL ANGLE OF DRIVE RING

RETAINING POSITION

AUTOMATIC FOCUS/EXPOSURE OPERATION APPARATUS FOR CAMERA

BACKGROUND OF THE INVENTION

The present invention relates to an automatic focus/exposure operating apparatus for a camera.

A conventional automatic focus/exposure operating apparatus for a camera, for instance, one disclosed in the specification and drawings of Japanese Utility Model Application No. 20793/1988, which is an earlier application filed by the present applicant, is known.

This prior-art automatic focus/exposure operating apparatus for a camera is so arranged as to be capable of shifting speedily to an exposure operation upon completion of a focussing operation of a camera, with the result that wasteful time between the lens driving and a blade opening/closing operation is shortened appreciably, thereby making it possible to provide an automatic focus/exposure operating apparatus for a camera which is suited for quick photographing and the like.

However, with the above-described prior art, the structure is such that reverse movement of a distance member after a focusing operation thereof is prevented, when a retaining pawl is engaged with a ratchet tooth of the distance member, and the blade opening/closing mechanism is adapted to operate in such a manner as to open the blades provided at the shutter opening when a driving member moves a predetermined amount in an opposite direction on the basis of an exposure detection value after the focusing operation of the distance member. Accordingly, a phase difference unavoidable occurs between the time of completion of the focusing operation of the distance member and the time of engagement of the ratchet tooth and the engaging pawl. Hence, there is a problem in that, depending on the degree of the phase difference, an error arises in an exposure which causes the blade opening/closing mechanism to open the blades.

In addition, if an attempt is made to solve the problem mechanically in such a manner as to stop the distance member immediately upon completion of the focusing operation without causing any deviation in its position so as to prevent that error, there is a drawback in that the apparatus becomes complicated, and higher costs result.

OBJECTS AND SUMMARY OF THE INVENTION

Accordingly, in order to overcome the above-described problems, in accordance with the present invention, there is provided an automatic focus/exposure operation apparatus for a camera which includes a drive member driven by a motor under the control of a control circuit, a distance member for driving a lens focusing mechanism in correspondence with movement together with the drive member, a retaining pawl for engaging with the distance member and preventing reverse movement thereof after a focussing operation, and a blade opening/closing mechanism operative in such a manner as to open the blades when the driving member drives the lens focusing mechanism and moves in the opposite direction of the same after a focussing operation, and which is capable of shifting to an exposure operation speedily upon completion of a lens focusing operation of the camera, the automatic focus/exposure operation apparatus for a camera being characterized in that a phase difference between the distance member and the retaining pawl upon completion of a focussing operation during retention by the same is detected, and that the extent of operation of the blade opening/closing mechanism by the drive member is corrected on the basis of the phase difference.

In accordance with the above-described arrangement, a phase difference between the time when a focusing operation of the distance member is completed and the time when the distance member is retained by the retaining pawl is detected, and the extent of operation of the blade opening/closing mechanism by the drive member, i.e., an exposure, is corrected on the basis of this phase difference so as to effect an exposure operation. As a result, it is possible to prevent an error from occurring in an exposure due to the amount of the focusing operation by the distance member.

BRIEF DESCRIPTION OF THE DRAWINGS

FIGS. 1–10 are diagrams illustrating a first embodiment of an automatic focus/exposure operating apparatus for a camera in accordance with the present invention, in which FIG. 1 is a front elevational view illustrating an initial state thereof;

FIGS. 2–4 are front elevational views respectively illustrating different operating states;

FIG. 5 is a sequence characteristic diagram of an automatic focus/exposure operation illustrating relationships between the amount of rotation of a drive ring, exposure and time;

FIG. 6 is a diagram illustrating relationships between a sequence characteristic diagram and time chart of each detection switch;

FIG. 7 is a return sequence characteristic diagram during a malfunction;

FIG. 8 is an expanded view illustrating positional relationships with a pawl portion of a ratchet pawl in respective cases where four pulses are output from a control circuit during a one-pitch rotation of a distance ring;

FIG. 9 is a block diagram of a portion of a control circuit;

FIG. 10 is a detailed diagram illustrating the results of correction of an exposure in the sequence characteristic diagram of an automatic focus/exposure operation;

FIGS. 11–14 are diagrams illustrating a second embodiment of the present invention, in which:

FIG. 11 is a front elevational view illustrating an initial state thereof;

FIGS. 12 and 13 are front elevational views illustrating different respective operating states;

FIGS. 14 is a sequence characteristic diagram of an automatic focus/exposure operation, illustrating relationships between an amount of rotation of a drive ring, exposure and time.

DETAILED DESCRIPTION OF THE PREFERRED EMBODIMENTS

Figure 1:
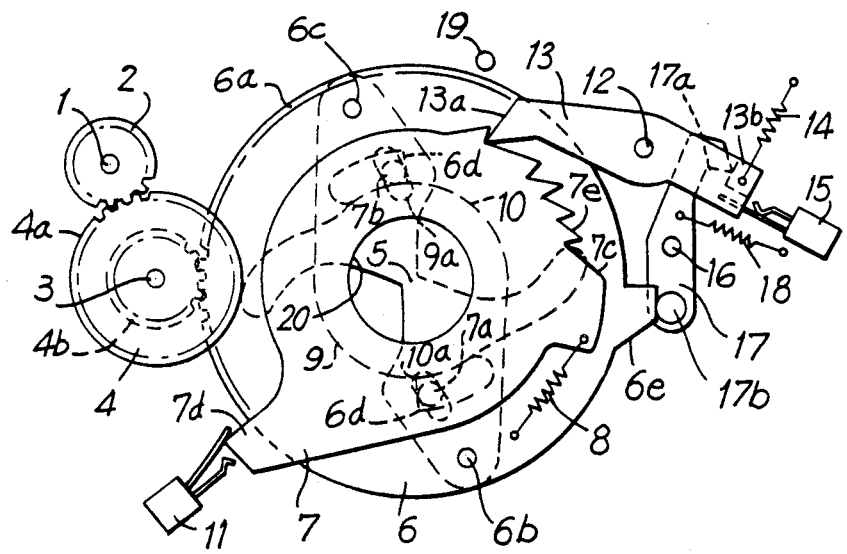

Referring now to the drawings, a description will be given of an embodiment of the present invention. FIGS. 1–10 are diagrams illustrating a first embodiment of an automatic focus/exposure operating apparatus in accordance with the present invention.

In FIG. 1, reference numeral 2 denotes a gear, and this gear rotates together with a rotor shaft 1 of a step motor whose rotation is controlled by an unillustrated control circuit so as be changed between, forward and reverse rotation. A large-diameter tooth portion 4a of an intermediate gear 4 meshes with the gear 2, and a tooth portion 6a provided around the outer periphery of a drive ring 6 (driving member) meshes with a small-diameter tooth portion 4b of the intermediate gear 4. In addition, the drive ring 6 is rotatively driven by the step motor in the forward and reverse directions around an optical axis 5. Shaft portions 6b, 6c are provided at two peripheral portions of the drive ring 6, and two bores having an abutting portion 6d are formed radially inwardly of these shaft portions 6b, 6c. Furthermore, a cam portion 6e is formed on the right-hand side, as viewed in the drawing, of the peripheral portion of the drive ring 6.

A distance ring 7 (distance member) is provided in an axially adjacent portion along the same optical axis 5 as the drive ring 6, and this distance ring 7 is movable in the axial direction of the optical axis 5 together with an unillustrated lens portion as the distance ring 7 rotates about the optical axis 5. Pins 7a, 7b projecting toward the drive ring 6 side are formed on the rear side, as viewed in the drawing, of this distance ring 7. These pins 7a, 7b are fitted with the two bores having the abutting portion 6d of the drive ring 6.

In addition, ratchet teeth 7e, a cam portion 7c at an end of this ratchet teeth 7e portion, and a switch actuating portion 7d are provided in a peripheral portion of the distance ring 7. A spring 8 is provided on a part of the cam portion 7c of the distance ring 7 in such a manner as to stretch between the same and the drive ring 6. This spring 8 urges the distance ring 7 clockwise relative to the drive ring 6 and causes the pins 7a, 7b thereof to abut against abutting portions 6d of the two bores of the drive ring 6, thereby effecting positioning of distance ring 7 relative to drive ring 6.

Ends of sectors (blades) 9, 10 are pivotally supported by the shaft portions 6b, 6c at two locations of the peripheral portion of the drive ring 6 on the rear side thereof, as viewed in the drawing, operating bores 9a, 10a being formed on the side of these sectors 9, 10 which is further from the optical axis 5 than the shaft portions 6b, 6c. Since the pins 7a, 7b of the distance ring 7 are fitted in the operating bores 9a, 10a of these sectors 9, 10, the sectors 9, 10 rotatively operate as the distance ring 7 and the drive ring 6 rotate relative to each other, thereby opening or closing the shutter opening 20.

Accordingly, the pins 7a, 7b of the distance ring 7, the operating bores 9a, 10a of the sectors 9, 10, and the shaft portions 6b, 6c of the drive ring 6 as a whole constitute the blade opening/closing mechanism of the sectors 9, 10.

A return detection switch 11 is provided in the vicinity of the lower left portion, as viewed in the drawing, of the drive ring 6. With respect to this return detection switch 11, when the distance ring 7, after having rotated counterclockwise, rotates clockwise to return, the switch actuating portion 7d thereof is brought into contact with detection switch 11, effecting an OFF operation.

A ratchet pawl 13 is pivotally supported by a shaft 12 in the vicinity of an upper right portion, as viewed in the drawing, of the distance ring, and when this ratchet pawl 13 has rotated counterclockwise, a pawl portion 13a at a tip thereof is retained by a ratchet tooth 7e of the distance ring 7. A rectangular retaining operation portion 13b is formed projecting from the rear side, as viewed in the drawing, of a rear-end portion of the ratchet pawl 13. Similarly provided at the rear-end portion of the ratchet pawl 13 is a spring 14, which is disposed between the same and a stationary portion, thereby urging the ratchet pawl 13 counterclockwise.

A pawl position detecting switch 15 is provided in the vicinity of the rear-end portion of the ratchet pawl 13. When the ratchet pawl 13 has rotated clockwise, the lower surface of its retaining operation portion 13b is brought into contact with pawl position detecting switch 15, thereby effecting an OFF operation.

Similarly provided in the vicinity of the rear-end portion of the ratchet pawl 13 is a retaining pawl 17 pivotally supported by a shaft 16. When this retaining pawl 17 has rotated clockwise, a pawl portion 17a at a distal end thereof is retained by the upper surface of the retaining operation portion 13b of the ratchet pawl 13. A pin portion 17b is provided at the rear-end portion of the retaining pawl 17, and when this pin portion 17b is pressed by the cam portion 6e of the drive ring 6 in such a manner as to rotate counterclockwise, the pawl portion 17a is disengaged from the upper surface of the retaining operation portion 13b of the ratchet pawl 13. In addition, the retaining pawl 17 is urged clockwise by a spring 18 provided midway thereof.

A pin 19 secured on an unillustrated bottom board is provided in the vicinity of an upper portion of the drive ring 6, a excessive movement of the drive ring 6 is prevented when a step portion of the cam portion 6e of the drive ring 6 is brought into contact with this pin 19.

Figure 2:
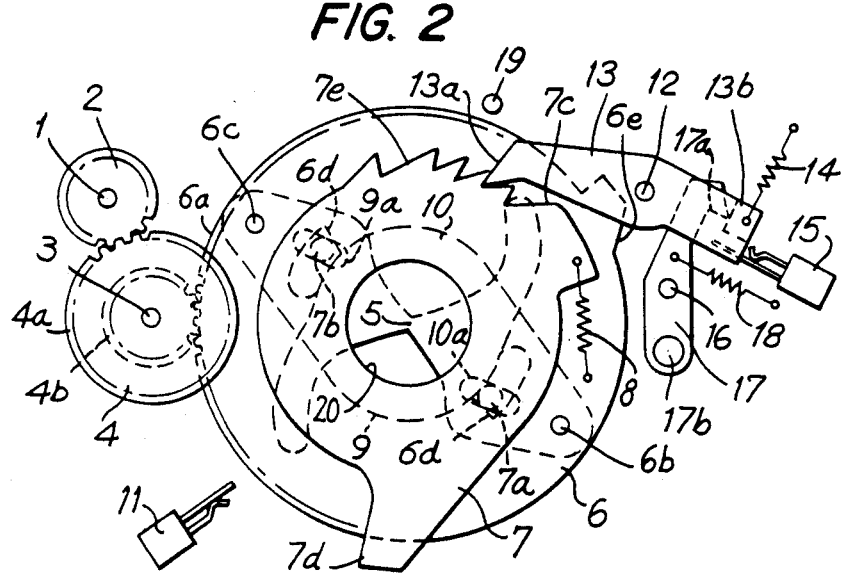

A description will now be given of the operation. The rotation of the step motor is transmitted from the gear 2 and is reduced by the intermediate gear 4, and is then transmitted by the tooth portion 6a of the drive ring 6, first causing the drive ring 6 to rotate counterclockwise, as viewed in FIG. 1. Subsequently, as the abutting portions 6d at the two bores in the drive ring 6 hit pins 7a, 7b, the distance ring 7 also rotates in interlinking manner in the same direction as the drive ring 6, and, at this time, the ratchet teeth 7e of the distance ring 7 are also moved in the same direction (forward direction) (FIG. 2).

Figure 6:
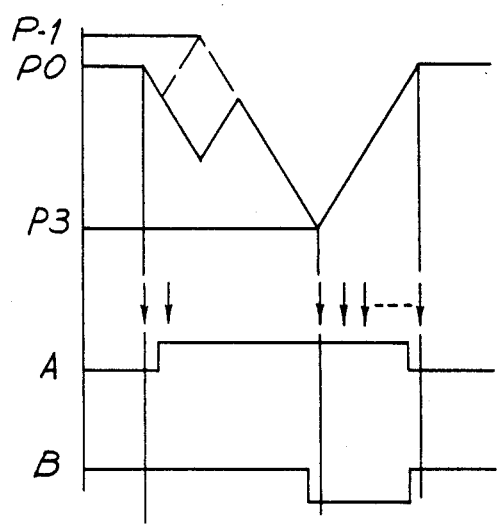

Immediately after the distance ring 7 has started to rotate, its switch actuating portion 7d is separated from the return detection switch 11, causing the same to effect an ON operation and thereby causing the same to input a rotation start signal to the control circuit (not shown) (A in the time chart of FIG. 6).

Then, as the distance ring 7 rotates about the optical axis 5, the distance ring 7 moves the unillustrated lens portion in the axial direction of the optical axis 5. As the control circuit drives the step motor for a predetermined duration of pulses on the basis of a focussing signal inputted to the control circuit, the drive ring 6 is rotated in such a manner that the lens portion moves by a predetermined amount up to the focussed position of the lens ($T_0$–$T_1$, $P_0$–$P_2$ in FIG. 5).

Upon completion of this focussing operation, the control circuit immediately causes the step motor to rotate reversely, thereby causing the drive ring 6 to rotate in the reverse direction (clockwise).

After this reversing is started, one of the ratchet teeth 7e of the distance ring 7 is retained by the pawl portion 13a of the ratchet pawl 13, and the reverse (clockwise) rotation of the distance ring 7 is prevented, thereby causing the lens portion to be held at that focussed position. For this reason, only the drive ring 6 rotates clockwise in opposition to the spring 8, and its shaft portions 6b, 6c also rotate in the same direction.

When the drive ring 6 is rotated relative to the distance ring 7, the pins 7a, 7b of the distance ring 7 are stopped and the shaft portions 6b, 6c of the drive ring 6 rotate, so that the operating bores 9a, 10a of the sectors 9, 10 are stopped and the ends of the sectors 9, 10 pivotally supported by the shaft portions 6b, 6c of the drive ring 6 rotate, with the result that the sectors 9, 10 rotatively operate, thereby opening or closing the shutter opening 20.

Figure 3:
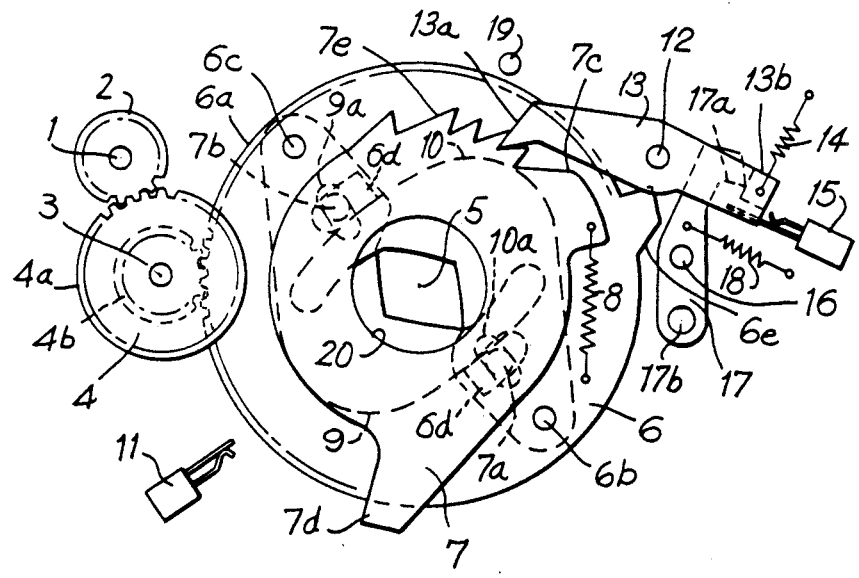
Figure 5:
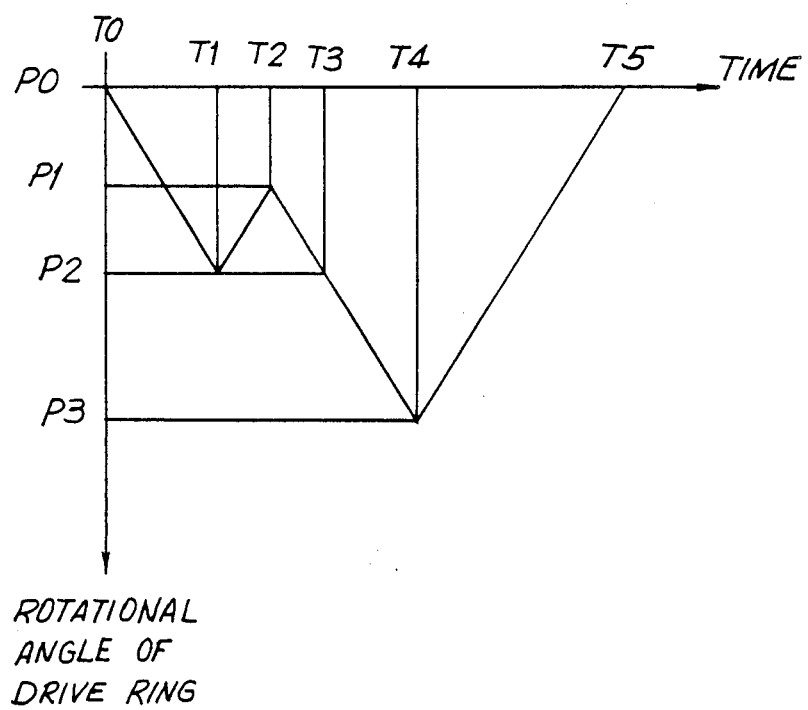

In other words, when the shutter opening 20 is opened by a predetermined amount on the basis of an exposure detection signal inputted to the control circuit, as shown in FIG. 3 ($T_1$-$T_2$, $P_2$-$P_1$ in FIG. 5), the drive ring 6 is immediately rotated in the reverse direction (counterclockwise) by the step motor controlled by the control circuit, so that the sectors 9, 10 close the shutter opening 20 ($T_2$-$T_3$, $P_1$-$P_2$ in FIG. 5).

Even after the sectors 9, 10 have closed the shutter opening 20, the drive ring 6 continues to rotate counterclockwise, and as its abutting portions 6d press the pins 7a, 7b in due course of time, the distance ring 7 is rotated again in interlinking relation in the same direction as the drive ring 6, while the ratchet teeth 7e of the distance ring 7 are also moved in the same direction.

Figure 4:
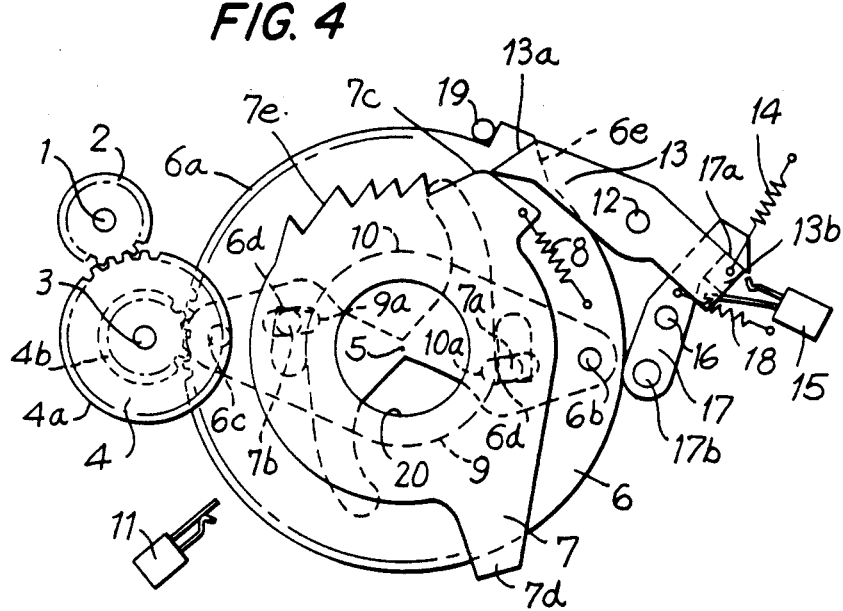

Consequently, a the ratchet teeth 7e vertically move the ratchet pawl 13 by small degrees. Subsequently, the cam portion 7c finally lifts up the pawl portion 13a higher than the previous level and rotates the ratchet pawl 13 clockwise by a large degree in opposition to the spring 14. For this reason, the retaining pawl 17 rotates clockwise by means of the spring 18, and the pawl portion 17a of the retaining pawl 17 is retained by the upper surface of the retaining operation portion 13b of the ratchet pawl 13, as shown in FIG. 4. Hence, with the pawl portion 13a of the ratchet pawl 13 being separated in such a manner as not to be retained by the ratchet teeth 7e, its position is held ($T_3$-$T_4$, $P_2$-$P_3$ in FIG. 5).

Immediately before this retention, the lower surface of the retaining operation portion 13b of the ratchet pawl 13 is brought into contact with the pawl position detecting switch 15 to effect an OFF operation (B in the time chart of FIG. 6).

For this reason, the distance ring 7 rotates clockwise together with the drive ring 6, and is returned to its initial position by the step motor which is rotated reversely under control from the control circuit to which an OFF signal from the pawl position detecting switch 15 is input ($T_4$-$T_5$, $P_3$-$P_0$ in FIG. 5).

Immediately before the distance ring 7 is returned to its initial position, the switch actuating portion 7d of the distance ring 7 is brought into contact with the return detection switch 11 to turn OFF the return detection switch 11 (A in the time chart of FIG. 6), and a return signal (OFF signal) is input to the control circuit, thereby returning the sequence cycle to its initial state.

In addition, immediately before the distance ring 7 returns to its initial position, the cam portion 6e of the drive ring 6 presses the pin portion 17b and causes the retaining pawl 17 to rotate counterclockwise. As a result, the pawl portion 17a of the retaining pawl 17 is disengaged from the upper surface of the retaining operation portion 13b of the ratchet pawl 13, so that the ratchet pawl 13 is rotated counterclockwise by the spring 14, causing its pawl portion 13a to be retained by one of the ratchet teeth 7e of the distance ring 7 placed in its initial position (FIG. 1). For this reason, the lower surface of the retaining operation portion 13b of the ratchet pawl 13 is separated from the pawl position detecting switch 15 so as to cause the same to effect an ON operation (B in the time chart of FIG. 6), similarly inputting a pawl position detection signal to the control circuit.

As shown in FIG. 6, the state of detection by the return detection switch 11 (A) and the pawl position detection switch 15 (B) is confirmed by the control circuit at the position of the illustrated arrow, and after that confirmation the operation proceeds with an ensuing control procedure. In particular, during the returning operation of the drive ring 6 and the distance ring 7 to their initial positions, confirmation is carried out frequently at predetermined intervals, as illustrated in the drawing.

Should the retention of the ratchet pawl 13 by the retaining pawl 17 be disengaged during the above-described returning operation, the returning operation of the distance ring 7 is prevented by the ratchet pawl 13, and relative rotation would occur between the drive ring 6 and the distance ring 7 and the sectors 9, 10 would open. The present arrangement is designed to prevent this from occurring.

Figure 7:
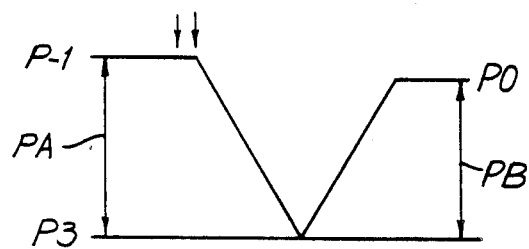

In the event that the results of confirmation by these detection switches differ from the desired results, a determination is made that a malfunction a such as the one described above, has occurred and a sequence operation for reset is carried out. For instance, even though the return detection switch 11 is be turned ON during the initial period of operation, it may be impossible to obtain that signal, and accordingly, the drive ring 6 is continuously rotated counterclockwise by an amount corresponding to the entire strike, as shown in FIG. 7, and is moved up to the state shown in FIG. 4. The distance ring 7 and the drive ring 6 are then made to effect a returning operation up to their initial positions. Even during this returning operation, confirmation of the state of detection by the detection switches is carried out frequently at predetermined intervals.

In the drawing, PA denotes $P_{-1}$-$P_3$ in FIG. 5, i.e., the entire stroke of the drive ring 6, while PB denotes $P_3$-$P_0$, i.e., the returning stroke of the distance ring 7 to its initial position.

$P_1$ in FIG. 6 denotes a fully open position of the drive ring 6 (reversing stop position) in a case where the distance ring 7 is retained by pawl 13 in an initial period when the amount of operation is small, and, at this juncture, the drive ring 6 rotates reversely up to $P_{-1}$ from the initial position of FIG. 1. Accordingly, a difference of $P_{-1}$-$P_0$ arises between the full stroke of the drive ring 6 and the returning stroke of the distance ring 7 up to its initial position.

Next, a description will be given of an operation of the above-described blade opening/closing mechanism, i.e., for correcting an exposure.

Figure 8:
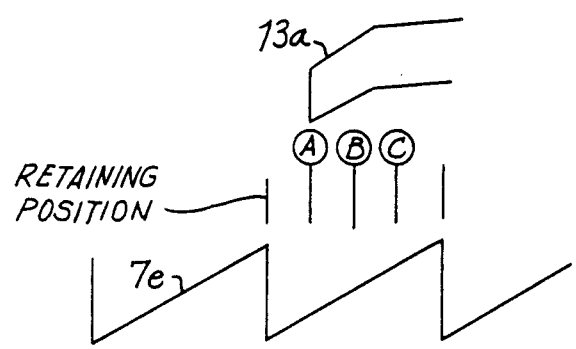

As shown in FIG. 8, it is assumed that four pulses are output during the one pitch rotation of the ratchet teeth 7e of the distance ring 7. In the drawing, no problem exists when the focussing position is at the retaining position, but when positions A, B, C other than the retaining position respectively become focussing positions, conventionally a phase difference unavoidably occurs with respect to an actual retaining position, and an error occurs by the portion of that phase difference in an amount whereby the blade opening/closing mechanism opens the blades at the shutter opening, i.e., an exposure.

Figure 15:
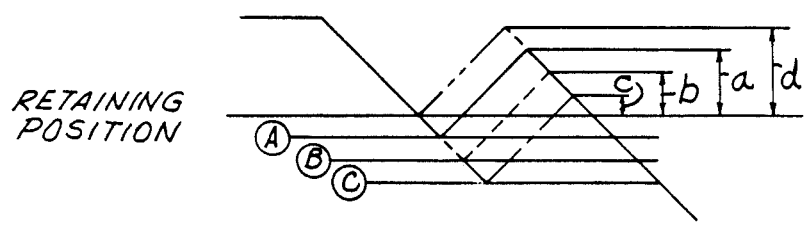
FIG. 15 is a detailed diagram illustrating the state occurrence of an error in an exposure in the sequence characteristic diagram of the operation of a conventional automatic focus/exposure operating apparatus for a camera.

In other words, conventionally, in the sequence characteristic diagram of operation shown in FIG. 15, if the drive ring 6 rotates reversely at the respective focussing positions A, B and C, the amount of exposure rotation after reverse rotation is fixed, so that an error occurs by the portion of the phase difference between the retaining position and the respective focussing positions A, B and C, with the result that actual exposures become a, b and c, respectively.

In short, if reverse rotation is effected from the focussing position A and an exposure is performed by a predetermined amount, an actual exposure a is offset by a portion corresponding to one pulse as compared with an exposure d which is the case where an exposure is carried out from the retaining position. In addition, if reverse rotation is effected from the focussing position B and an exposure is performed, the actual exposure b is offset by a portion corresponding to two pulses, while, if reverse rotation is effected from the focussing position C and an exposure is performed, the actual exposure c is offset by a portion corresponding to three pulses, with the result that the largest error in the exposure results.

Figure 9:
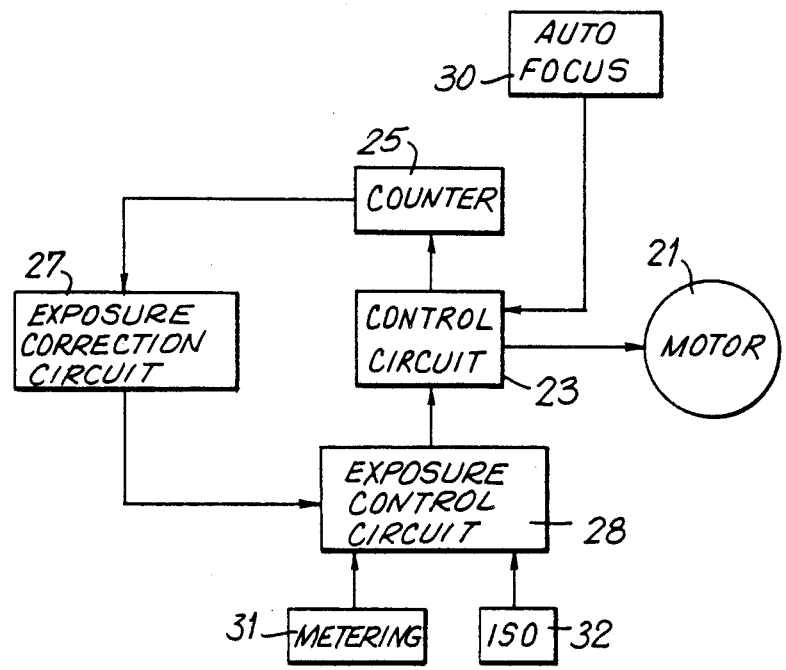

To solve the above-described problem, as shown in FIG. 9, the control circuit 23 for driving the lens portion by controlling the step motor 21 is provided with a counter 25 for counting the drive pulses of the lens portion, and an error with the above-described retaining position is determined by the pulses occurring until the distance ring 7 rotatively moves to the focussing position. As for a method of calculation thereof, for instance, an arrangement may be provided such that the pulses occurring until the distance ring 7 rotatively moves to the focussing position are compared with the pulse data for the retaining position, and the least difference may be regarded as the error between the focussing position and the retaining position. Alternatively, data on the difference for each pulse may be stored in advance in a ROM.

These errors are calculated by an exposure correction circuit 27, and correction is performed for the exposure pulses by an exposure control circuit 28 on the basis of this calculated value. By virtue of this correction, when, for instance, reverse rotation is effected from the focussing position A to effect an exposure of a predetermined amount, an actual exposure d is corrected in such a manner that a portion corresponding to one more pulse than in a conventional case is added so that the amount will become just identical with that in the case where the exposure is effected from the retaining position.

Figure 10:
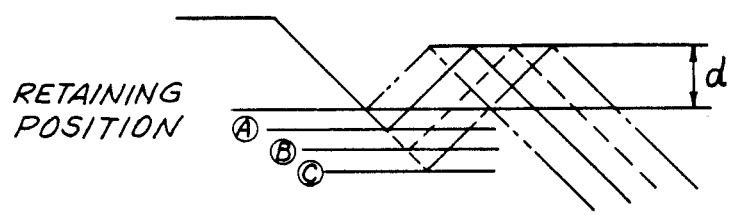

In addition, in the case where the exposure is effected by effecting reverse rotation from the focussing position B, the actual exposure d is corrected in such a manner that a portion corresponding to two more pulses is added than in a conventional case, while, in the case where the exposure is effected by effecting reverse rotation from the focussing position C, the actual exposure d is corrected in such a manner that a portion corresponding to three more pulses is added than in a conventional case. In other words, as shown in FIG. 10, in cases where the focussing position is at any position A, B and C, the actual exposure uniformly becomes d as a result of correction, so that it is possible to prevent an error in the exposure from occurring by virtue of the amount of the focussing operation of the distance ring 7.

In FIG. 9, reference numeral 30 denotes a focus detection sensor for automatic focussing or the like, while numerals 31, 32 denote exposure detection sensors such a photometry, ISO, etc.

FIGS. 11 to 14 illustrate a second embodiment of the present invention. Although in the above described first embodiment a description has been given of an apparatus in which the lens portion is of a helicoid type (helical type which moves while undergoing helical movement), this second embodiment is a case where the lens portion is a straight advancing type.

Figure 11:
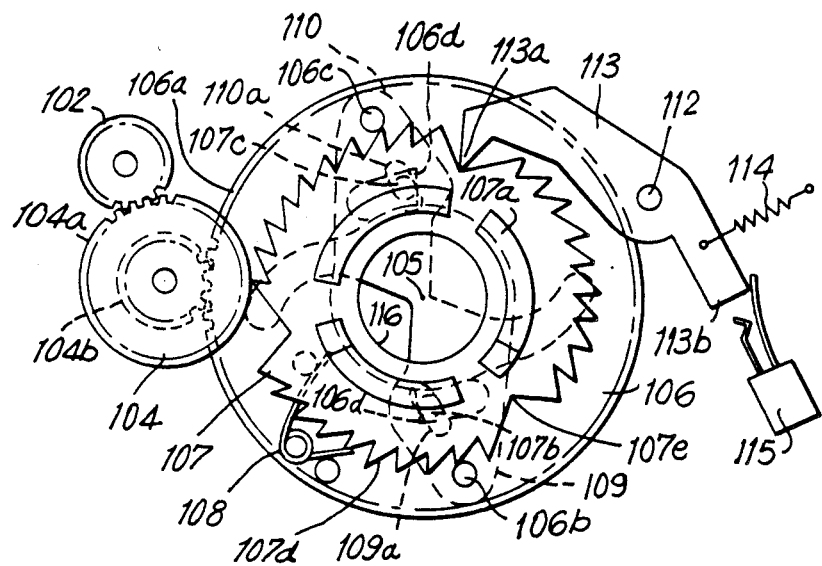

In other words, in FIG. 11, a ratchet gear 107d divided into three groups is formed around a peripheral portion of a distance ring 107, and three cam portions 107a are formed on the side thereof which is remote from the side where a drive ring 106 is provided. An unillustrated lens member is disposed on the side of the cam portions 107a of the distance ring 107, and this lens member is of the so-called straight advancing type and is so arranged to be capable of moving in the direction of an optical axis 105 as the cam portions 107a rotate.

The mechanism and operation whereby the sectors 109, 110 open and close a shutter opening 116 are identical with those of the above-described first embodiment. In addition, a spring 108 for rotatively urging the distance ring 107 clockwise relative to the drive ring 106 is interposed between the drive ring 106 and the distance ring 107.

FIG. 11 illustrates an initial position, and as a gear 102 is rotated counterclockwise by a step motor, that rotation is reduced by a large diameter tooth portion 104a and a small diameter tooth portion 104b of an intermediate gear 104 and is then transmitted to a tooth portion 106a of the drive ring, thereby causing the drive ring 106 to rotate counterclockwise.

Figure 12:
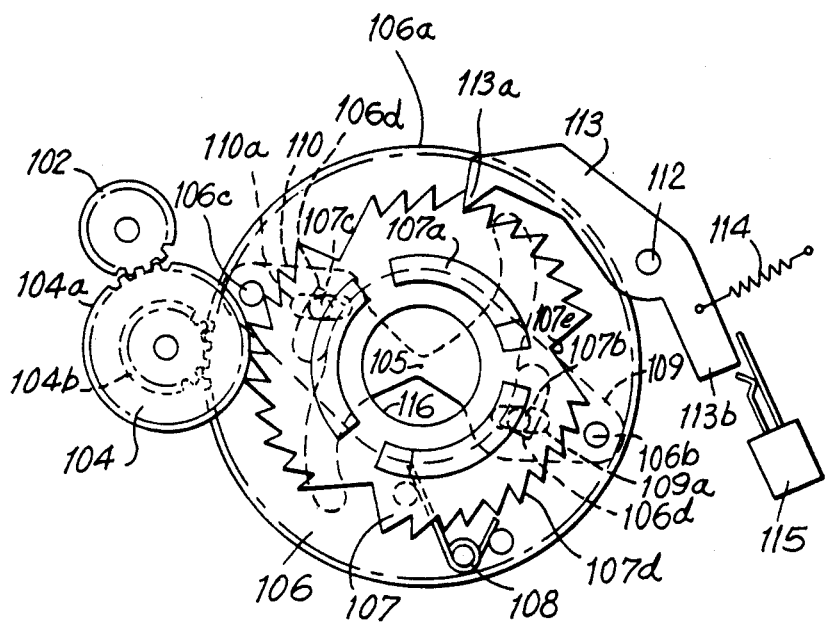

At this juncture, as abutting portions 106d at two bores provided in the drive ring 106 press pins 107b, 107c, the distance ring 107 also moves in interlinking relationship in the same direction as that of the drive ring 106, and the ratchet teeth 107d of the distance ring are also moved in the same direction (FIG. 12). When the ratchet teeth 107d of the distance ring 107 are moved to a predetermined position on the basis of a focussing signal input by a control circuit ($T_0$–$T_1$, $P_0$–$P_2$), the gear 102 rotates reversely and starts to rotate clockwise, with the result that one of the ratchet teeth 107d is retained by a pawl portion 113a of a ratchet pawl 113.

At this juncture, the lens member is engaged with the cam portion 107a of the distance ring 107, and immediately after the lens member is moved by a predetermined amount in the direction of the optical axis 105 to a position at which the lens is focussed by the predetermined rotation of the distance ring, one of the ratchet teeth 107d is retained by the pawl portion 113a of the ratchet pawl 113.

Furthermore, as the gear 102 continues to rotate clockwise, the drive ring 106 rotates in the same direction. At this time, since the distance ring 107 has a ratchet tooth 107d retained by the pawl portion 113a of the ratchet pawl 113, the drive ring 106 rotates in opposition to the spring 108 by leaving the distance ring 107. At this time, the pins 107b, 107c of the distance ring 107 are fixed and retain operating bores 109a, 110a provided in sectors 109, 110, and shaft portions 106b, 106c pivotally supporting the sectors 109, 110 rotate clockwise.

Figure 13:
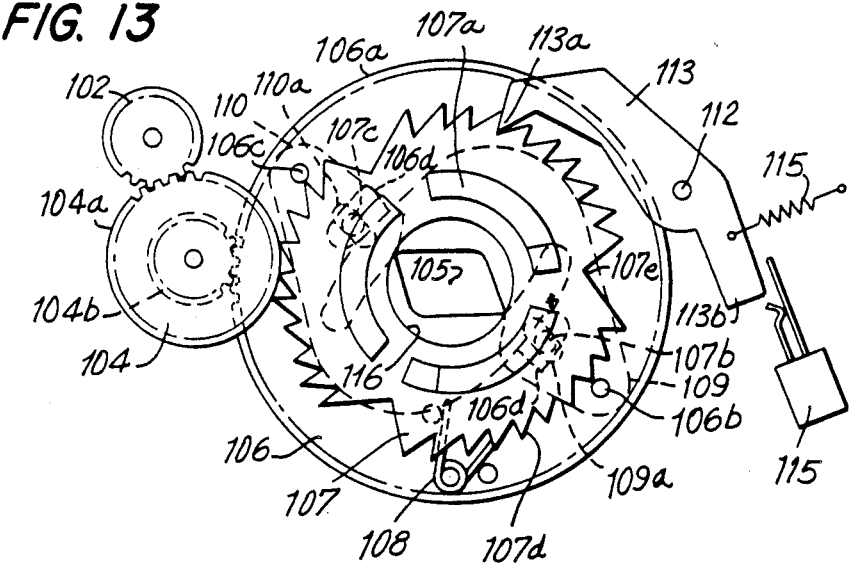
Figure 14:
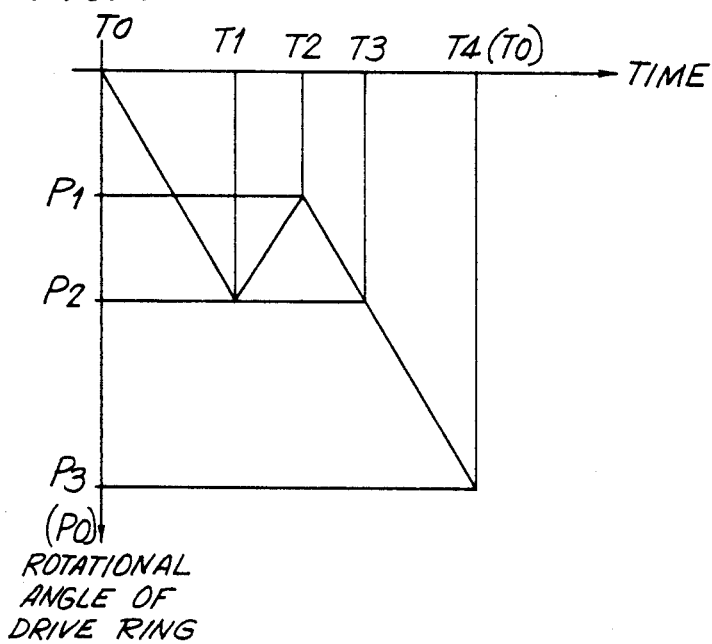

Accordingly, as shown in FIG. 13, the sectors 109, 110 rotate clockwise, thereby opening the shutter opening 116 ($T_1$-$T_2$, $P_2$-$P_1$ in FIG. 14).

When an exposure operation is carried out by a predetermined amount on the basis of an exposure detection signal input to the control circuit, the drive ring 106 immediately rotates in the opposite direction (counterclockwise), and the sectors 109, 110 close the shutter opening 116 ($T_2$-$T_3$, $P_1$-$P_2$ in FIG. 14).

After the sectors 109, 110 close the shutter opening 116, the drive ring 106 continues to rotate counterclockwise, and in due course of time its abutting portions 106d press the pins 107b, 107c, so that the distance ring 107 is moved again in interlinking relationship in the same direction as that of the drive ring 106. As a result, the ratchet teeth 107d of the distance ring 107 are moved in the forward direction, and when an ensuing initial position arrives at which the pawl portion 113a of the ratchet pawl 113 is retained by a recessed portion 107e where they are discontinued, the distance ring 107 stops by means of the gear 102, thereby completing one cycle of operation ($T_3$-$T_4$, $P_2$-$P_3$ in FIG. 14).

In this second embodiment, when the initial position is reached at which the pawl portion 113a of the ratchet pawl 113 is retained by the recessed portion 107e, a rear-end portion 113b of the ratchet pawl 113 which is on the side opposite to the pawl portion 113a causes a return detection switch 115 to effect an OFF operation, so that a return signal is input to the control circuit, thereby returning the sequence cycle to its initial state.

It should be noted that although, in the above-described embodiments, each member is arranged in such a manner as to rotate around a shutter opening, the drive ring and the distance ring may be arranged as members that reciprocatingly move linearly.

In addition, although, in the above-described embodiment, a description has been given in reference to drawings in which ratchet teeth are formed at an outer peripheral portion of the distance member, it is preferred that, as disclosed in Japanese Patent Laid-Open No. 200337/1987, a gear is provided around an outer peripheral portion of the distance member, and that a pinion meshing with this gear is provided together with the ratchet teeth, and it goes without saying that the present invention may be arranged as such.

As described above, in accordance with the present invention, in an automatic focus/exposure operating apparatus for a camera which is capable of shifting speedily to an exposure operation upon completion of a lens focussing operation, it is possible to prevent an exposure error from occurring due to the amount of focussing of a distance member.

We claim:

1. Apparatus for performing an automatic focus/exposure operation for a camera, comprising:
    a drive member driven by a motor;
    distance member means for driving a lens focussing mechanism during a lens focussing operation in correspondence with movement of said drive member in a first direction;
    retaining pawl means for engaging said distance member means to prevent reverse movement of said distance member means upon completion of said lens focussing operation; and
    blade opening/closing means supported between said drive member and said distance member for opening blades during an exposure operation when said drive member moves in a second direction which is opposite to said first direction of said focussing operation, said blade opening/closing means shifting said exposure operation quickly upon completion of said lens focussing operation.

2. Apparatus for performing an automatic focus/exposure operation for a camera, comprising:
    a drive member driven by a motor;
    distance member means for driving a lens focussing mechanism during a lens focussing operation, in correspondence with movement of said drive member in a first direction;
    retaining pawl means for engaging said distance member means to prevent reverse movement of said distance member means upon completion of said lens focussing operation;
    blade opening/closing means for opening blades during an exposure operation when said drive member moves in a second direction which is opposite to said first direction of said focussing operation, said blade opening/closing means shifting said exposure operation quickly upon completion of said lens focussing operation;
    detection means for detecting a phase difference between said distance member means and said retaining pawl means upon completion of said lens focussing operation, when said distance member means is engaged by said retaining pawl means; and
    control means for correction the extent of operation of said blade opening/closing means by said drive member in response to said phase difference detected by said detection means.

3. Apparatus according to claim 2, wherein said drive member is rotatably mounted along an optical axis, and said distance member means is coaxially mounted for rotation with said drive member along said optical axis.

4. Apparatus according to claim 3, wherein said distance member means includes a peripheral portion having ratchet teeth thereon, and said retaining pawl means engages with said ratchet teeth upon completion of said lens focussing operation.

5. Apparatus according to claim 3, further including pin means for rotatably connection said distance member means with said drive member when said drive member is rotated in said first direction.

6. Apparatus according to claim 3, further including spring means for biasing said distance member means in said second direction.

7. Apparatus according to claim 2, wherein said blade opening/closing means includes pin means connected with said drive member for opening said blades during said exposure operation.

8. Apparatus according to claim 2, wherein said detection means includes counter means for counting drive pulses supplied to said motor for driving said drive member during said lens focusing operation until said distance member means is engaged by said retaining pawl means, and exposure correction means for producing an error signal corresponding to said phase difference in response to said drive pulses and a reference signal.

9. Apparatus according to claim 8, wherein said exposure correction means includes comparator means for comparing the number of said drive pulses with reference pulse data corresponding to a reference position of said distance member means with respect to said retaining pawl means.

10. Apparatus according to claim 2, wherein said control means includes exposure control means for controlling said motor to drive said drive member in said second direction by an amount in correspondence with said phase difference detected by said detection means.

11. Apparatus according to claim 1, wherein said drive member comprises pivot support means for pivotably supporting said blades.

12. Apparatus according to claim 1, wherein said opening/closing means comprises an operable means operably associating said drive member and said distance member with said blades such that relative rotation between drive member and said distance member effects opening and closing of said blades.

13. Apparatus according to claim 1, wherein said blades are pivotably mounted on said drive member and said opening/closing means is operable to open said blades upon relative rotation between said drive member and said distance member.

14. Apparatus according to claim 1, wherein said drive member has opening means and said distance member has pin means received in said opening means such that engagement between said opening means and pin means effects driving of said distance member by said drive member as said drive member rotates in said first direction, said blades also having opening means which receive said pin means on said distance member such that relative rotation between said drive member and said distance member effects rotation of said blades.

* * * * *